United States Patent [19]
Even

[11] 3,970,954
[45] July 20, 1976

[54] DIGITAL FREQUENCY MULTIPLIER
[75] Inventor: Reed Kamenetzky Even, Livingston, N.J.
[73] Assignee: Bell Telephone Laboratories, Incorporated, Murray Hill, N.J.
[22] Filed: Apr. 3, 1975
[21] Appl. No.: 564,650

[52] U.S. Cl. .............................. 331/53; 307/220 R; 307/221 R; 328/15
[51] Int. Cl.² ........................................ H03B 19/00
[58] Field of Search ............ 328/14, 15; 307/220 R, 307/221 R; 331/53

[56] References Cited
UNITED STATES PATENTS
3,798,564  3/1974  Langham .............................. 331/2
3,885,138  5/1975  Bates .................................... 328/15

*Primary Examiner*—John Kominski
*Attorney, Agent, or Firm*—R. O. Nimtz

[57] ABSTRACT

A circuit arrangement for multiplying the repetition rate of an input signal by digital techniques is disclosed. A digital counter driven by a high speed clock generates a count proportional to the input period. This count or a different count generated by translating the input count is stored repetitively at the end of each input period. A second counter is used to count the same reference pulses and produce an output pulse when its count equals the stored count.

Alternatively, one of the counters can be reset to a non-zero value at the end of each of its operation cycles, thus allowing a match to be reached in an appropriate output period.

8 Claims, 4 Drawing Figures

(LANGHAM 3,798,564)

DIGITAL FREQUENCY MULTIPLIER

BACKGROUND OF THE INVENTION

This invention relates to signal frequency multiplying circuits and, more particularly, to the use of simplified digital circuitry for multiplying the frequency of an input signal.

DESCRIPTION OF THE PRIOR ART

In J. M. Langham U.S. Pat. No. 3,798,564, granted Mar. 19, 1974, there is disclosed a frequency multiplying scheme using digital techniques. In particular, a first reference oscillator drives a first counter to measure and store the length of input signal period. A second reference oscillator driving a second counter counts an output pulse period. This output counter is reset and an output pulse generated when the output count is equal to the stored input count. The multiplication factor is simply the ratio of the frequencies of the two reference oscillators.

The advantage of a digital multiplier of the Langham type is the ability to multiply by any positive real rational number and is not limited to integer multiplications. It is an open loop system and can track very rapid changes in input frequency without delays or hysteresis effects. The disadvantages of the Langham multiplier include, in addition to the complexity of the circuitry, the necessity for a highly stable relationship between the frequencies of the two oscillators. This in turn leads to complex and expensive oscillator designs.

SUMMARY OF THE INVENTION

In accordance with the illustrative embodiments of the present invention, the major disadvantage of the Langham multiplier is overcome while retaining all of its advantages by utilizing a single reference oscillator and driving both counters with this single oscillator. Multiplication is accomplished by allowing the two counters to count a different number of count pulses having a prescribed relationship which ensures the desired multiplication factor. This can be accomplished, for example, by translating the input count into a different count for comparison with the output count. Alternatively, one of the counters may be preset to a non-zero value on each cycle and thus require a different counting interval to reach the desired output count.

The arrangement described above has the rapid tracking advantage and the flexible multiplication factor advantage of the Langham circuit and yet utilizes only a single reference oscillator which need not be particularly accurate in its frequency. The accuracy of the multiplication factor is heavily dependent on the numerical relationships and is independent of the precise oscillator frequency.

DETAILED DESCRIPTION OF THE DRAWINGS

Figure 1:
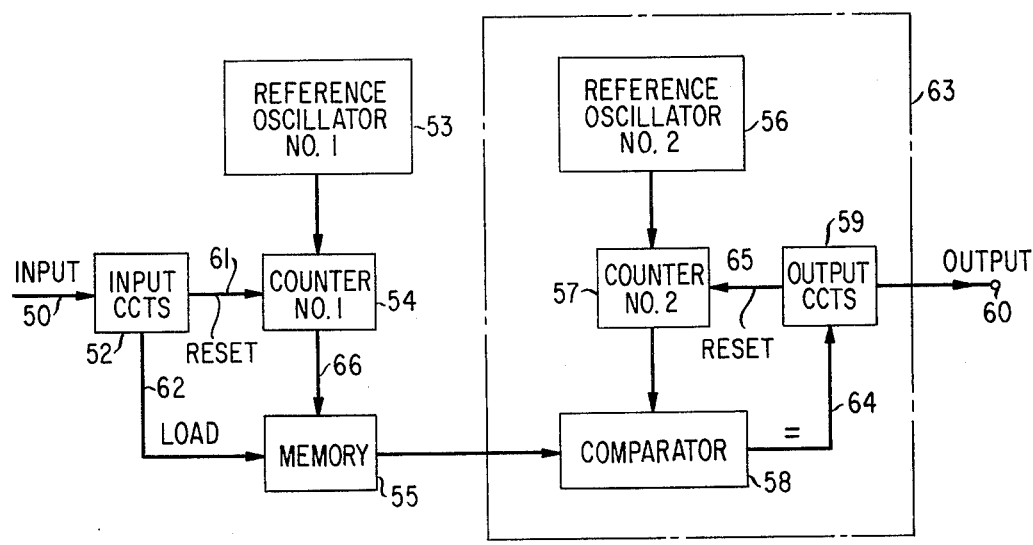
FIG. 1 represents a block diagram of a portion of FIG. 2 of J. M. Langham U.S. Pat. No. 3,798,564 and represents the state of the prior art.

In FIG. 1 there is shown a portion of the disclosure of J. M. Langham, U.S. Pat. No. 3,798,564 which represents the state of the prior art in digitally controlled frequency multipliers. The reference numerals in FIG. 1 correspond with the reference numerals of FIG. 2 in the Langham patent.

The frequency multiplier of FIG. 1 comprises an input line 50 on which there appears an alternating current signal, the frequency of which is to be multiplied. Input line 50 is connected to input circuits 52 which serve primarily as gating circuits to derive pulses for establishing the proper system connections at the proper time.

A reference oscillator 53 serves as a source of a first reference frequency signal and is used to supply pulses to counter 54. The reset terminal of counter 54 is connected to input circuits 52 by way of reset lead 61. The output of counter 54 is connected by way of lead 66 to the input of a memory 55 which may take the form of any digital memory compatible with counter 54 such that digital counter signals from counter 54 can be stored in memory 55. The loading terminal of memory 55 is connected to input circuits 52 by way of lead 62. A signal on lead 62 loads the counter signals then present on the outputs of counter 54 into memory 55. Input circuits 52, oscillator 53, counter 54, and memory 55 are therefore interconnected to operate as a sampling circuit which stores a digital signal representing the instantaneous period of the input signal on lead 50.

A second reference oscillator 56 serves as a source of a second reference frequency signal and supplies pulses to counter 57. The output of counter 57 is connected as one input to a comparator circuit 58. The other input to comparator 58 is taken from memory 55. The comparator 58 can be any digital comparator having an output indicating when the two input signals are equal. This indication of equality appears on lead 64 and is applied to output circuits 59. Output circuits 59 operate as gating circuits to produce an output pulse at output terminal 60 in response to each equality signal on lead 64, and thereafter, by way of lead 65, to reset counter 57.

Reference oscillator 56, counter 57, comparator 58, and output circuits 59 operate as a digital oscillator 63 which functions as a slave oscillator in the overall system of FIG. 1. Moreover, digital oscillator 63 is connected in an open loop relationship to the sampling circuit including elements 52, 53, 54 and 55 to generate an output signal at terminal 60 whose frequency is a multiple of the frequency of the input signal on lead 50.

In operation, input circuits 52 generate pulses from the signals on lead 50 and apply these pulses to reset counter 54 by way of lead 61. Just prior to this time, the previous existing count in counter 54 is loaded into memory 55 in response to a pulse on lead 62. Counter 54 thereafter counts pulses from oscillator 53 up until the next cycle of the input signal on lead 50, which recycles the sampling circuit as described above.

Concurrently with the operation of the sampling arrangement, counter 57 counts output pulses from oscillator 56. Comparator 58 compares this count with the contents of memory 55. Whenever these two counts are equal, a signal on lead 64 produces, by way of output circuits 59, an output pulse at terminal 60 and simultaneously resets counter 57 by way of lead 65. An output pulse therefore appears at terminal 60 once for every M pulses of reference oscillator 56, where M is the count stored in memory 55 and represents the period of input signals on lead 50. Stated differently, the circuit of FIG. 1 produces pulses at output terminal 60 at a frequency which is related to the frequency of input signals on input 50 by a factor which is equal to the ratio of the frequencies of oscillators 53 and 56. The circuit of FIG. 1 therefore provides a digitally-controlled frequency multiplier. Moreover, the multiplication factor of the multiplier of FIG. 1 can assume any positive, real, rational number simply by appropriate adjustment of the relative frequencies of the two oscillators 53 and 56. The system is an open loop system and thus can track changes in input frequency with a delay which never exceeds a single period of the input signal.

Unfortunately, the circuit of FIG. 1 requires two separate reference oscillators 53 and 56. More importantly, the accuracy and stability of the multiplication process in FIG. 1 is directly dependent on the tracking characteristics of the two independent oscillators. This dictates that reasonably good accuracy and a reasonable range of multiplication factors will demand extremely stable oscillator designs with oscillation frequencies precisely adjustable to desired values. This increases the complexity, and thus the cost and reliability, of the digital multiplier circuit.

Figure 2:
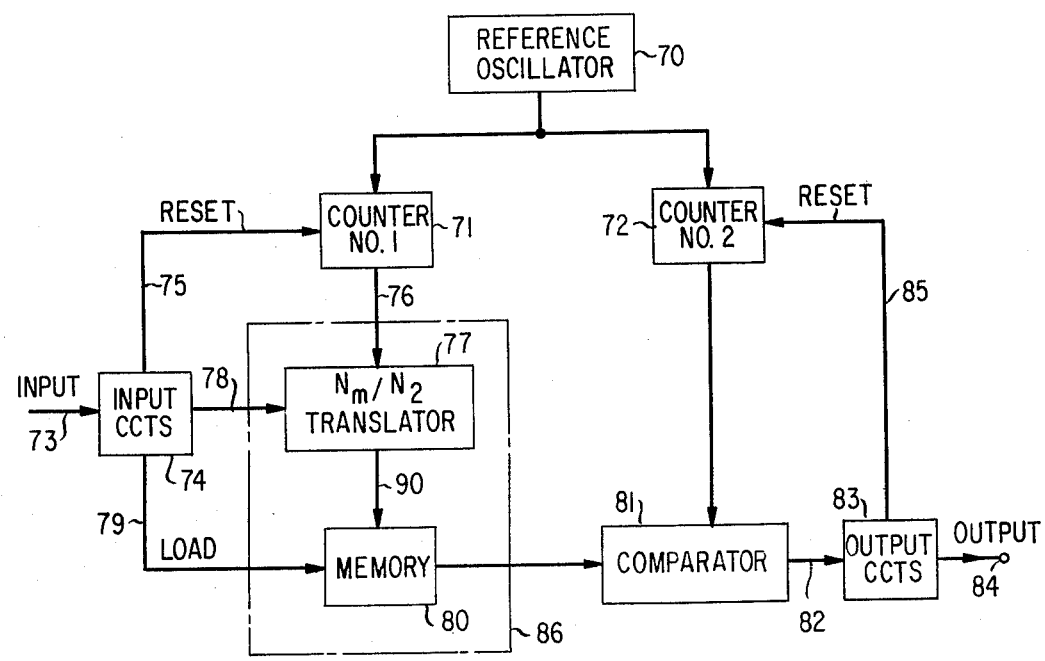
FIG. 2 is a detailed block diagram of a first embodiment of the present invention in which the numerical value of the input period is translated to another value before storage for comparison.

In FIG. 2 there is shown a detailed block diagram of a digital multiplier circuit which forms one illustrative embodiment of the present invention and comprises a single reference oscillator 70 driving two counters 71 and 72. Input signals, the frequency of which is to be multiplied, appear on input lead 73 and are applied to input circuits 74. Once each period of the input signal on lead 73, a reset signal is generated on lead 75 which resets counter 71 and transfers the previous count in counter 71, by way of leads 76, to a translator circuit 77. Another signal from circuit 74 on lead 78 enables translator circuit 77 to translate the count ($N_m$) appearing on leads 76 into a different, but specifically related, value ($N_i$) on leads 90. A load signal on lead 79 serves to enter this translated value on leads 90 into memory 80.

The output of counter 72 is connected, similarly to FIG. 1, to comparator circuit 81 which detects when the output from counter 72 is equal to the output from memory 80, and, at that time, produces an output signal on lead 82. This output signal is applied to output circuit 83 which produces an output pulse at terminal 84 and applies, by way of lead 85, a signal to reset counter 72 to zero.

It is easily shown that $$N_i = \frac{1}{k} N_m \quad (1)$$

where $k = f_{out}/f_{in}$ is the frequency multiplication factor.

In operation, the circuit performs similarly to the circuit in FIG. 1 except that the count $N_m$ from counter 71 is not stored in memory 80. Instead a different value $N_i$, related to this count by equation (1), is stored in memory 80. Due to this arrangement, counter 72 does not count to a value which is equal to the period of input signals on lead 73 as in FIG. 1. Instead counter 72 counts to a value which is related to the multiplication factor in accordance with equation (1). Due to this arrangement, both of counters 71 and 72 can be driven by a single reference oscillator 70. It is therefore not necessary to adjust the frequencies of two different oscillators to a closely regulated ratio. Furthermore, the accuracy and stability of the multiplication process is not dependent upon the relative frequencies of two oscillators, nor even upon the stability of the frequency of the one oscillator. Instead the accuracy of the multiplier circuit of FIG. 2 is dependent only upon the ratio of the frequency of oscillator 70 and the frequency of the input signal on lead 73. That is, accuracy is a function of the numerical value of the count for any given period, and the only errors are round-off errors. The frequency of oscillator 70 can easily be made quite large, particularly since the stability of this oscillator itself need not be particularly good.

It will be noted that the combination of the translator 77 and the memory 80 in box 86 might easily be arranged so that these two elements are interchanged in position. That is, the output from counter 71 might be stored directly in memory 80 and the translation take place at the output of memory 80 prior to application of the translated count to comparator 81. Indeed, and in accordance with a preferred embodiment of the present invention, box 86 might comprise nothing but a memory circuit which is addressed by signals on leads 76 and which has the appropriate translated value stored in the addressed storage location. In this embodiment, no active translation takes place during the operation of the circuit. Instead, all of the possible translations within the ranges of operation of the components of the circuit are precalculated and stored in the memory 80 at the appropriate storage locations.

Figure 3:
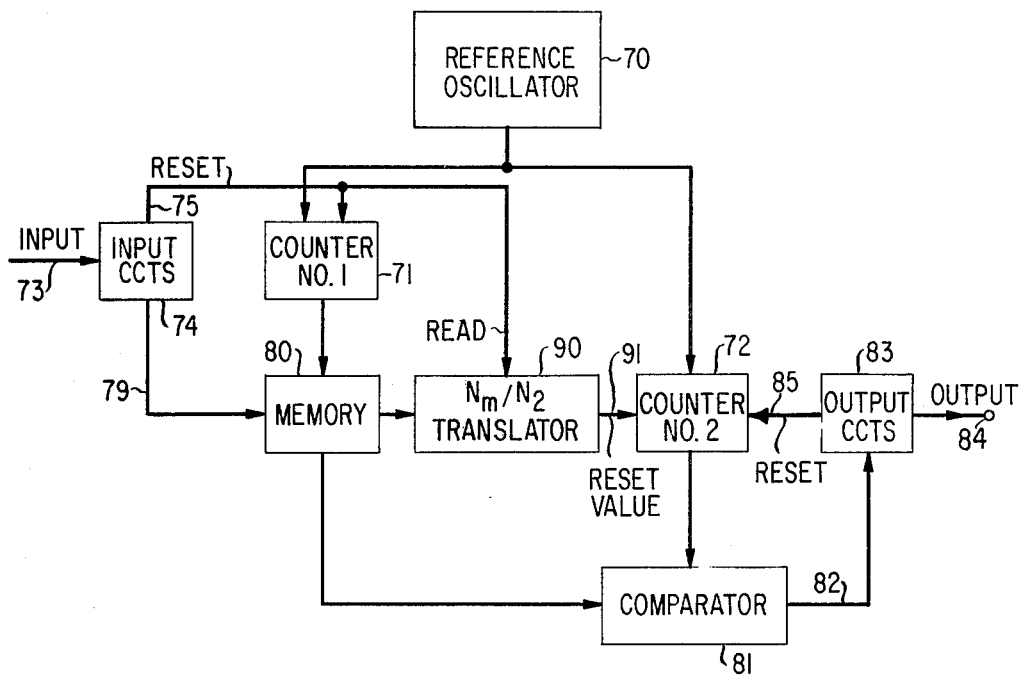
FIG. 3 is a detailed block diagram of a second embodiment of a frequency multiplication circuit in accordance with the present invention in which the output counter is reset to a non-zero value.

In FIG. 3 there is shown a modification of the digital multiplier circuit of FIG. 2 having all the advantages thereof but operating in a somewhat different manner. Similar elements have been identified with the same reference numerals for convenience.

In general, the circuit of FIG. 3 operates by presetting counter 72 to a non-zero value at the end of each output cycle. This non-zero value is related to the value of the count from counter 71 in such a manner that when reference pulses from oscillator 70 are used to advance this count, they will reach a value equal to that stored in memory 80 after a period of time equal to the desired period of the output pulses. A translator circuit 90 translates the count in memory 80 into an appropriate reset value on leads 91. When counter 72 is reset by a signal on lead 85, rather than being reset to zero it is reset to the value on leads 91. As before, when the count in counter 72 is equal to the value stored in memory 80, compare circuit 81 generates an output pulse on lead 82 to output circuits 83. Output circuits 83, in turn, supply an output pulse to output terminal 84 and reset counter 72. Translator circuit 90 is enabled by a signal on lead 75 which is also used, as discussed in connection with FIG. 2, to reset counter 71.

The ratio $k$ of the input and output frequencies in FIG. 3 is given by the following formula:

$$k = \frac{f_{out}}{f_{in}} = \frac{N_m}{N_m - N_2} \qquad (2)$$

where $f_{out}$ is the frequency of the output signal at terminal 84, $f_{in}$ is the frequency of the input signal on lead 73, $N_m$ is the value stored in memory 80, and $N_2$ is the value to which counter No. 2 (counter 72) is reset after each output cycle. The value to which counter 72 must be set is therefore given by the formula:

$$N_2 = N_m \left(1 - \frac{1}{k}\right). \qquad (3)$$

Again, translation circuit 90 can be used to perform this translation dynamically or, alternatively, memory 80 can be used to store appropriate translation values at the addresses provided by counter 71.

Figure 4:
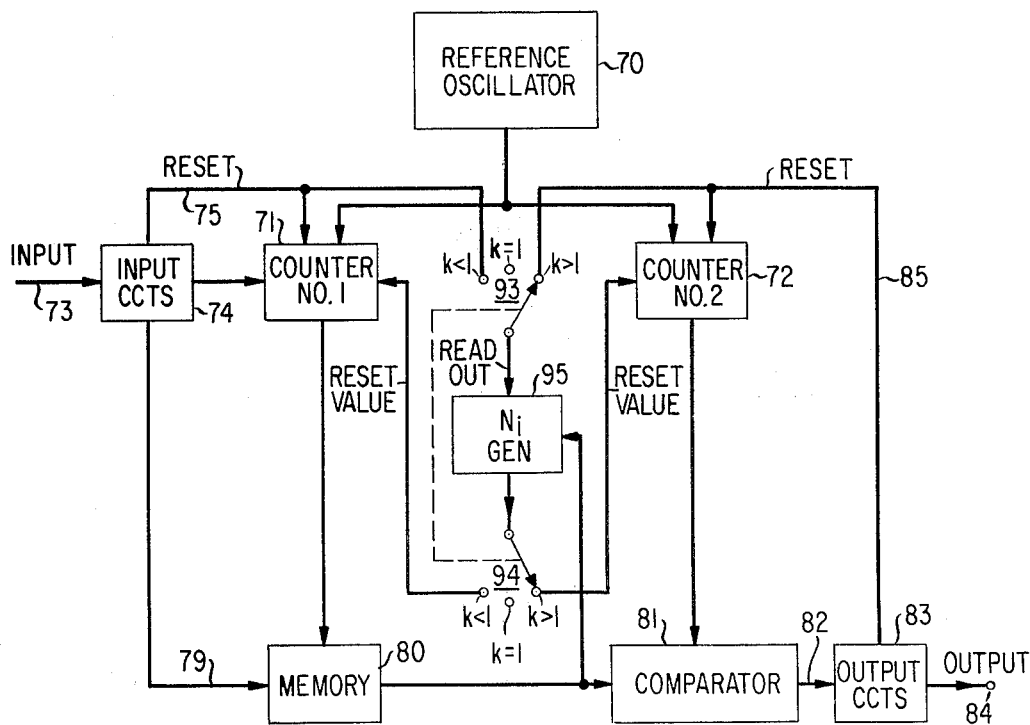
FIG. 4 is a block diagram of an improvement over the embodiment of FIG. 3 which permits the resetting of either the input or the output to a non-zero value in order to permit multiplication by values greater than or less than one.

The arrangement of FIG. 3 can be further modified to permit frequency multiplication by factors smaller than one as well as by factors larger than one by the arrangement in FIG. 4. Again, similar circuit elements have been identified with the same reference numerals in FIG. 4 as were used in FIGS. 2 and 3. In FIG. 4, however, three-position switches 93 and 94 are provided which are ganged to operate together. Each of switches 93 and 94 has three positions corresponding to multiplication factors less than equal to or greater than one. In the central position, where $k=1$, no multiplication takes place, and the frequency of the output signal is the same as the frequency of the input signal. With switch 93 and 94 in a position marked by "$k > 1$" ($k$ is greater than one), the circuit is essentially that shown in FIG. 3 and serves as a frequency multiplying circuit. If switches 93 and 94 are set at a position marked "$k < 1$" ($k$ is less than one), the circuit operates as a frequency dividing circuit.

In operation, the circuit of FIG. 4 alternately permits one or the other of counters 71 or 72 to be reset to zero while the other counter is reset to some value greater than zero. If counter 71 is reset to zero, multiplication takes place; if counter 72 is reset to zero, division takes place. The actual multiplication or division factors are determined by the reset values generated in a reset value generator 95. If the ratio of the output frequency to the input frequency is given by $k$, then the reset values for counter 72 for frequency multiplication are given by the relationship:

$$N_2 = N_m \left(1 - \frac{1}{k}\right), \qquad (4)$$

corresponding to equation (3). If, on the other hand, switches 93 and 94 are in the frequency division position ($k < 1$), the reset values are given by the formula:

$$N_1 = N_m (1 - k), \qquad 5.$$

As previously noted, a read-only memory with appropriate translated values stored at the addresses corresponding to the counts of counter 71 is the least expensive implementation of the arrangements of the present invention. This memory is entered with all of the values of output counts for any given $k$ and for the expected variations in the range of the count of counter 71.

It may seem at first that this memory needs to be of high capacity. This does not prove to be so, however, because the memory needs to operate with integers only and the ranges of the variables are not excessive. The limitations on the accuracy of the multiplication or division process arise almost entirely from round-off-errors in the digital signals. Simply extending the length of the counts by utilizing a higher frequency reference oscillator and more stages in the counters can bring this accuracy to any required level.

What is claimed is:

1. A frequency multiplication circuit comprising
 means for receiving input signals,
 a reference oscillator,
 a first counter for counting the number of cycles of said reference oscillator in each period of said input signals,
 means for systematically translating each of the output counts of said first counter into a different translated count,
 a second counter for counting the number of cycles of said reference oscillator in each period of an output signal, and
 a comparator circuit for determining from signals derived from both said first and second counters the termination of each period of said output signal.

2. The frequency multiplication circuit according to claim 1 wherein
 said translating means is connected between said first counter and said comparator circuit.

3. The frequency multiplier circuit according to claim 1 wherein
 said translating means is connected between said first counter and the presetting terminals of said second counter.

4. Apparatus for multiplying the frequency of an input signal comprising
 sampling means responsive to said input signal and including a source of a reference frequency signal for determining a first signal representative of the instantaneous period of said input signal,
 translating means for translating said first signal into a different signal related to said first signal by a function of the multiplication factor, and
 generating and comparing means also responsive to said same source of a reference frequency signal and to said translating means for determining an output signal representative of the instantaneous period of the output signal.

5. A frequency multiplier comprising
 a reference signal source,
 two counters both counting the cycles of said reference signal source,
 means for modifying the count of the first one of said counters for each period of an input signal, and
 means for comparing the counts derived from said two counters to determine the period of the output signal.

6. The frequency multiplier according to claim 5 further including
 means for applying the output of said modifying means to said comparing means.

7. The frequency multiplier according to claim 5 further including
 means for applying the output of said modifying means to preset one of said counters.

8. The frequency multiplier according to claim 7 wherein
 said period of said output signal exceeds said period of said input signal, and
 said applying means is connected to apply the output of said modifying means to said first counter.

* * * * *